(12) United States Patent
Suzuki et al.

(10) Patent No.: US 6,583,896 B1
(45) Date of Patent: Jun. 24, 2003

(54) IMAGE READING APPARATUS AND IMAGE READING METHOD

(75) Inventors: Kenji Suzuki, Kanagawa (JP); Yoshio Ozawa, Kanagawa (JP); Hideo Ishizaka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/383,922

(22) Filed: Aug. 26, 1999

(30) Foreign Application Priority Data

Aug. 26, 1998 (JP) .......................................... 10-240797

(51) Int. Cl.[7] ................................................ H04N 1/04
(52) U.S. Cl. ........................ 358/487; 358/474; 358/496; 358/408; 348/496
(58) Field of Search ................................. 358/506, 487, 358/483, 408, 486, 496, 498, 474, 509, 475; 355/70, 40, 41, 48, 50; 348/96, 97

(56) References Cited

U.S. PATENT DOCUMENTS

| | | | | |
|---|---|---|---|---|
| 5,568,270 A | * | 10/1996 | Endo | 358/298 |
| 5,684,601 A | * | 11/1997 | Endo | 358/298 |
| 5,767,989 A | * | 6/1998 | Sakaguchi | 358/474 |
| 5,991,010 A | * | 11/1999 | Nishio | 355/82 |
| 6,304,684 B1 | * | 10/2001 | Niczyporuk et al. | 382/318 |

* cited by examiner

*Primary Examiner*—Cheukfan Lee
(74) *Attorney, Agent, or Firm*—Sughrue Mion, PLLC

(57) ABSTRACT

A low cost image reading apparatus and an image reading method is obtained which allows a high speed image reading process to be performed. When a frame image recorded on a negative film is read, the amount of light of a lamp and the charge accumulation time of a CCD area sensor provided in the prescan section of a film image reading apparatus are fixed. An image buffer is also provided for holding the density values data (the image data) obtained by the fine scan section until the auto setup processing and positive image examination, which are based on the density values data, are completed.

13 Claims, 11 Drawing Sheets

IMAGE READING APPARATUS AND IMAGE READING METHOD

BACKGROUND OF THE INVENTION

1. Field of the Invention

The present invention relates to an image reading apparatus and an image reading method, and particularly to an image reading apparatus and image reading method for reading images recorded on a photographic photosensitive material such as a photographic film.

2. Description of the Related Art

A type of conventional laboratory system for processing an image recorded on a photographic photosensitive material such as a photographic film (hereafter, referred to as "photographic film") exists in which, firstly, a comparatively high speed, low detail preparatory reading (hereafter referred to as a "prescan") is performed to read the image. Next, on the basis of the image data obtained from the prescan, the photometric condition for when a comparatively low speed, high detail main reading (hereafter referred to as a "fine scan") is performed to read the image, and the processing condition of the image processing performed on the image data obtained from the fine scan are determined. The fine scan is performed in accordance with the determined photometric condition and image processing is performed on the image data obtained from the fine scan in accordance with the above-described determined processing condition.

In this type of laboratory system, two photometric systems, each provided with CCD sensor for reading the image are provided in the image reading apparatus used to read an image recorded on a photographic film with the aim of speeding up the image reading process. One photometric system is used for performing the prescan and the other photometric system is used for performing the fine scan thus allowing the prescan and fine scan to be performed in parallel.

However, in the above-described image reading apparatus equipped with two photometric systems, in both the prescan and the fine scan, a charge accumulation time of the CCD sensor and the amount of light irradiated onto the image to be read are changed in accordance with the type of the image to be read and so on. Therefore, drawbacks exist in that the overall structure of the image reading apparatus is complex and the cost thereof is high. This is explained in more detail below.

FIG. 11 is a graph showing an example of the relationship between the negative image density (input density value) and the photometric value (output density value) for a negative image from which the photomertic measurement is performed by a CCD sensor.

As is shown in FIG. 11, the relationship between the negative image density and the photometric value is ideally a straight line with a gradient of 45°. However, in actuality, because of the effect of offset C with respect to the input density value, the linearity of the line cannot be maintained in the high density region. When various high-accuracy processings are performed using the photometric values obtained using the CCD sensor, only the region where the line is highly linear, i.e. excluding the high-density region, can be used, leading to a narrow dynamic range.

Two methods can be considered in order to increase the linearity of the high-density region. In one method, the amount of light irradiated onto the negative image is increased, while in the other method, the charge accumulation time is changed. The above described image reading apparatus equipped with two photometric systems, however, is structured so that the amount of light and the charge accumulation time can be adjusted for each photometric system. Therefore, the structure of each photometric system is complex and the cost of the overall device is high.

The present invention was conceived in order to solve the above-described drawbacks and the objective thereof is to provide an image reading apparatus and an image reading method which can perform a rapid image reading at a low cost.

SUMMARY OF THE INVENTION

In order to achieve the above objective, the image reading apparatus according to the first aspect of the present invention comprises:

transporting means for transporting a photographic photosensitive material on which an image is recorded in such a way that the image passes in sequence over a first reading position and a second reading position;

a first photometric system which is provided with a first light source for irradiating light onto the image at the first image reading position and which is also provided with a first image sensor for reading with fixed photometric condition the image and outputting the image as image data on the basis of one of the light transmitted through the image or the light reflected from the image;

a second photometric system which is provided with a second light source for irradiating light onto the image at the second image reading position and which is also provided with a charge accumulation-type second image sensor for reading the image and outputting the image as image data on the basis of one of the light transmitted through the image or the light reflected from the image; and control means for controlling the second photometric system in such a way that the image is read by changing at least one of amount of light irradiated from the second light source and a charge accumulation time of the second image sensor on the basis of the image data output from the first image sensor.

According to the image reading apparatus of the first aspect of the present invention, a photographic photosensitive material having an image recorded thereon is transported by the transporting means so that the image passes in sequence through the first reading position and the second reading position.

Light is irradiated onto the image at the first reading position by the first light source provided in the first photometric system. The image is then read by the first image sensor provided in the first photometric system on the basis of the light transmitted through the image or the light reflected from the image with the photometric condition in a fixed state, and the image is output as image data. Light is then irradiated onto the image at the second reading position by the second light source provided in the second photometric system. The image is then read by the charge accumulation-type second image sensor provided in the second photometric system on the basis of the light transmitted through the image or the light reflected from the image, and the image is output as image data. Note that the type of sensor used as the above-described first image sensor includes all types of photoelectrically convertible sensors such as a silicon photodiode in addition to charge accumulation-type image sensors. While the type of sensor used as the second image sensor includes CCD-type sensors and MOS-type sensors. Moreover, the amount of light irradiated from the above first light source and the charge accumulation time when the above first image sensor is a charge accumulation-type sensor are included in the photometric condition.

At this stage, when the image is being read by the above-described second photometric system, the second photometric system is controlled so that the image is read with at least one of the amount of light irradiated from the second light source and the charge accumulation time of the second image sensor being changed by the control means on the basis of the image data output from the first image sensor.

Namely, for example, as was mentioned above, when the image data obtained from the prescan is used for determining the photometric condition and so on for performing the fine scan, even if the linearity of the above image data is comparatively low there is no problem, however, the image data obtained from the fine scan is used for outputting an actual image which means that a high linearity is required.

Accordingly, the prescan can be performed by the first photometric system of the present invention in which an image is read with the above-described photometric condition in a fixed state. By structuring the first photometric system in this way, the structure of the first photometric system can be simplified (i.e. be of a lesser quality than the second photometric system)

In this way, according to the image reading apparatus of the first aspect of the present invention, because the photometric condition provided in the first photometric system are fixed, the structure of the first photometric system can be simplified in comparison to a structure in which the photometric condition are adjusted. Thus the effect of a reduction in the overall cost of the device is achieved.

In the image reading apparatus according to the second aspect of the present invention, the control means according to the first aspect of the present invention performs, the control means performs:
  at least one of: the detection of the position of the image; the detection of the size of the image; the detection of the DX code when the DX code is affixed to the photographic photosensitive material; the detection of the frame number when the frame number is affixed to the photographic photosensitive material; the determination of whether or not the image is an unneeded image; and the determining of the photometric condition of the second photometric system on the basis of the image data output from the first photometric system, and;
  at least one of: the determining of the processing condition for the image processing for the image data output from the second photometric system; and the inspection of the image using the image data output from the second photometric system on the basis of the image data output from the second photometric system.

According to the image reading apparatus of the second aspect of the present invention, the control means performs: at least one of: the detection of the position of the image; the detection of the size of the image; the detection of the DX code when the DX code is affixed to the photographic photosensitive material; the detection of the frame number when the frame number is affixed to the photographic photosensitive material; the determination of whether or not the image is an unneeded image; and the determining of the photometric condition of the second photometric system on the basis of the image data output from the first photometric system, and; at least one of: the determining of the processing condition for the image processing for the image data output from the second photometric system; and the inspection of the image using the image data output from the second photometric system on the basis of the image data output from the second photometric system.

The above-mentioned DX code is a widely used code indicating the maker and sensitivity of the photographic photosensitive material. Unneeded images include images in which the focus on the subject of the photograph is blurred (commonly known as "blurred focussing"), and images which are extremely under-exposed or extremely over-exposed to the extent that the subject of the image is unidentifiable. The photometric processing condition for the second photometric system include the charge accumulation time when the image is read by the second image sensor and the amount of light from the second light source. The image processing condition include the image enlargement/reduction ratio, hypertone and hyper-sharpness image processing condition, and gradation conversion conditions. The image inspection (examination) is an examination of the image data by an operator who refers to the image which is displayed on a display means such as a CRT display using the image data.

In the image reading apparatus according to the second aspect of the present invention, because the above image position detection, image size detection, DX code detection, frame number detection, unneeded image determination, and second photometric system photometric condition determination can all be performed using comparatively low precision image data, they are performed using the image data obtained by the first photometric system having fixed photometric condition. Moreover, because the determining of the image processing condition for the image data output from the second photometric system and the examining of the image using the image data output from the second photometric system are preferably performed using comparatively high precision image data, they are performed using the image data obtained by the second image sensor having a variable charge accumulation time.

In this way, processing which can be performed using comparatively low precision image data is performed on the basis of the image data obtained by the first photometric system. Only processing which is preferably performed using comparatively high precision image data is performed on the basis of image data obtained by the second photometric system. Therefore, the overall image reading efficiency of the device can be improved and the speed of the image reading can be increased.

According to the image reading apparatus according to the third aspect of the present invention, in the image reading apparatus of the second aspect of the present invention, there is further provided a storage means in which the image data output from the second photometric system is stored until at least one of the determining of the processing condition for the image processing for the image data output from the second photometric system and the examination of the image using the image data output from the second photometric system is completed.

According to the image reading apparatus of the third aspect of the present invention, the image data output from the second photometric system, in the image reading apparatus according to the second aspect of the present invention, is stored in the storage means until at least one of the determining by the control means of the image processing condition for the image data output from the second photometric system and the examining by the control means of the image using the image data output from the second photometric system is completed.

In this way, according to the image reading apparatus of the third aspect of the present invention, the same effect as in the second aspect of the present invention can be achieved. Because the image data output from the second photometric system is stored in the storage means until at least one of the determining by the control means of the image processing condition for the image data output from the second photometric system and the examining by the control means of the image using the image data output from the second photometric system has been completed, the operation of reading the image by the second photometric system and at least one of the determining by the control means of the image processing condition for the image data output from the second photometric system and the examining by the control means of the image using the image data output from the second photometric system can be performed in parallel and the speed at which the image is read can be increased.

Note that, as in the fourth aspect of the present invention, in the image reading apparatus according to the first through third aspects of the present invention, an area sensor can be used for the first image sensor and a line sensor can be used for the second image sensor.

Namely, when, for example, the afore-mentioned prescan is performed using the first photometric system and the fine scan is performed using the second photometric system, as is explained above, during the prescan the image is read at comparatively high speed and at a low level of precision while during the fine scan the image is read at comparatively low speed and at a high level of precision. Therefore, in comparison with the second image sensor, a low resolution area sensor can be used for the first image sensor which allows a low cost sensor to be used for the first image sensor enabling the overall cost of the device to be reduced.

In the image reading method according to the fifth aspect of the present invention, a photographic photosensitive material on which an image is recorded is transported in such a way that the image passes in sequence over a first reading position and a second reading position;

light from a first light source is irradiated onto the image at the first image reading position, and the image is read by a first image sensor with fixed photometric condition and output as image data on the basis of one of the light transmitted through the image or the light reflected from the image;

at least one of amount of light irradiated onto the image from a second light source and a charge accumulation time of a charge accumulation-type second image sensor are changed on the basis of the output image data, and light from the second light source is irradiated onto the image at the second image reading position and the image is read by the second image sensor and output as image data on the basis of one of the light transmitted through the image or the light reflected by the image.

In this way, according to the image reading method of the fifth aspect of the present invention, because the image recorded on the photographic photosensitive material is read by the first image sensor with the photometric condition in a fixed state, in the same way as in the first aspect of the present invention, compared to when the photometric condition are adjusted, the structure of the device can be simplified and the cost of realizing the present invention is reduced.

DESCRIPTION OF THE PREFERRED EMBODIMENTS

The embodiment of the present invention will now be explained in detail with reference to the figures.

Figure 11:
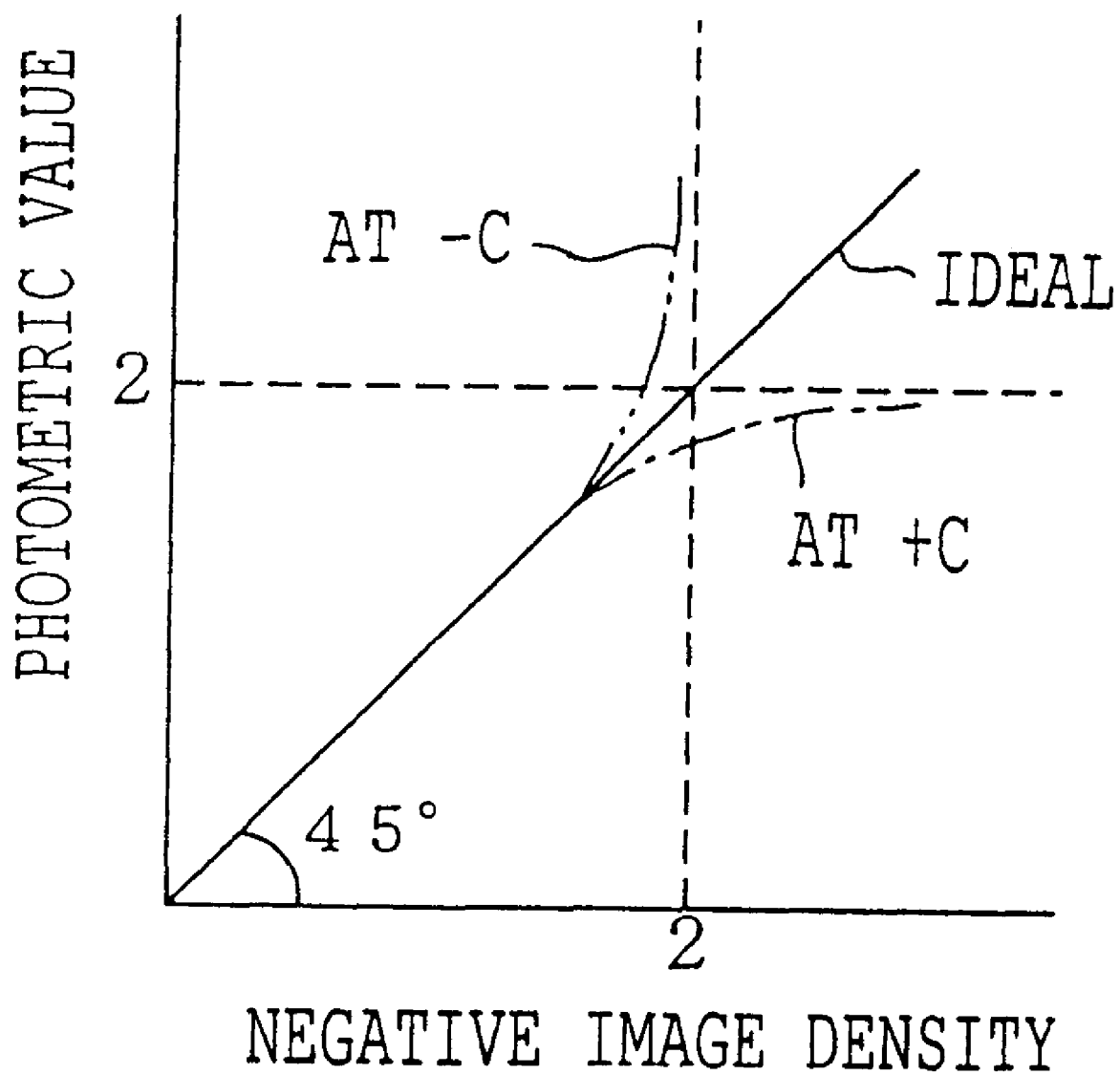
FIG. 11 is a graph showing an example of the relationship between the density of a negative image and the photometric value when the light of a negative image is measured using a CCD sensor.

The photographic processing system 10 according to an embodiment of the present invention is shown in FIG. 11. In the present photographic processing system 10, several rolls of a negative film 12 consisting of a photosensitive material onto which a predetermined number of images have been photographed using an unillustrated camera are prepared. The several rolls of negative film are spliced together using splicing tape and are set in the film processor 14 of the present photographic processing system 10 after being wound on in coiled layers.

Inside the film processor 14 are provided in the following sequence: a color developing tank 20; a bleaching tank 22; a bleaching fixing tank 24, washing tanks 26 and 28, and a stabilizing tank 30. A predetermined processing solution is stored in each of these processing tanks. The negative film 12 set in the film processor 14 is fed through each of the processing tanks in sequence and undergoes processings for color developing, bleaching, bleaching fixing, washing, and stabilizing by being immersed in each of the processing solutions. By this process, the negative image recorded as a latent image on the negative film 12 is visualized.

A drying section 32 is disposed on the downstream side of the stabilizing tank 30. The drying section 32 is provided with an unillustrated fan and heater. The air flow generated by the fan is warmed by the heater, and this warm air is supplied to the negative film 12 resulting in water adhering to the surface of the negative film 12 being dried off. The negative film 12 processed in the film processor 14 is first wound into coiled layers and then set in a film image reading apparatus 16.

Figure 2:
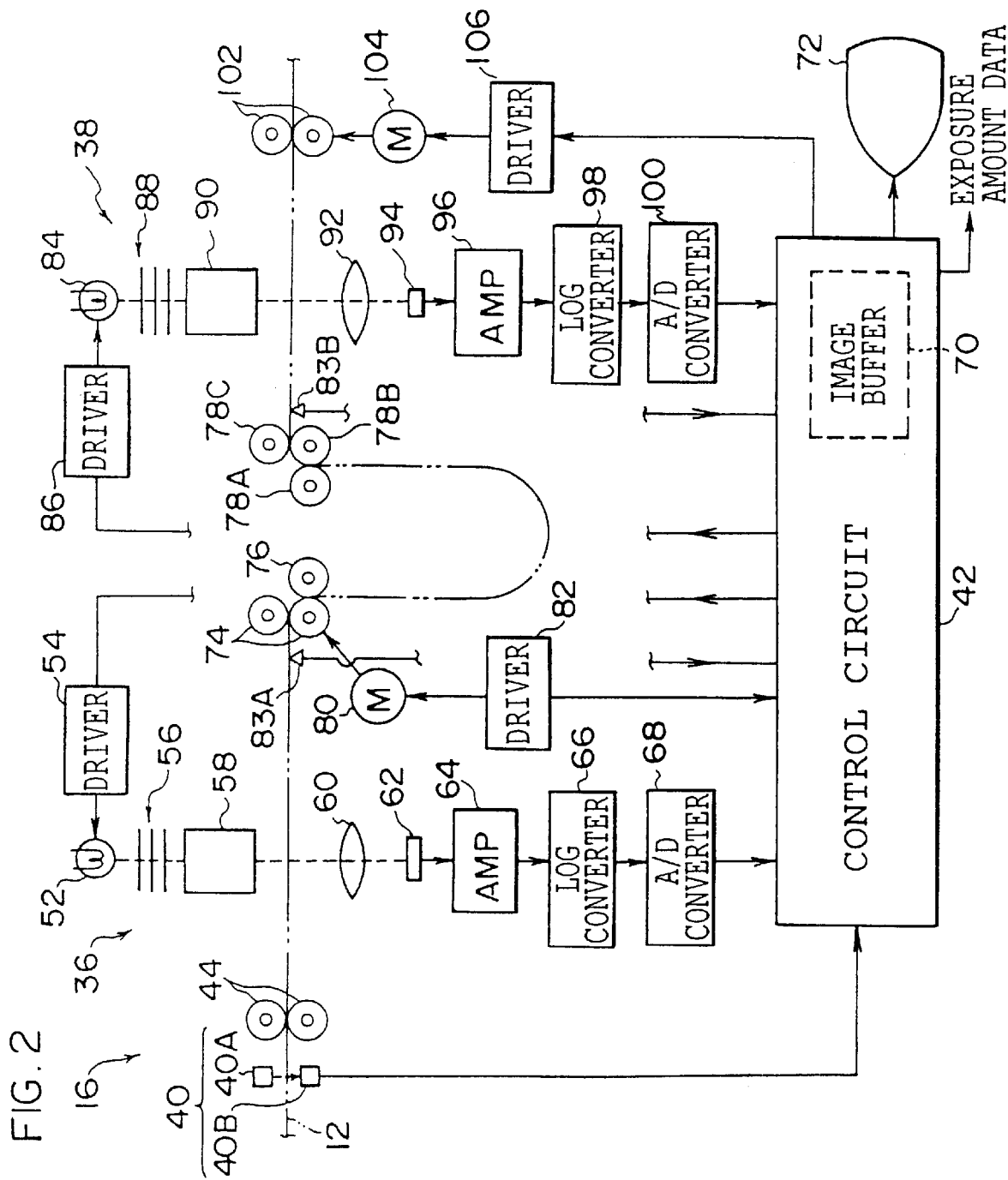
FIG. 2 is a schematic structural diagram of a film image reading apparatus.

As is shown in FIG. 2, A prescan section 36 and a fine scan section 38 are disposed in that sequence in the direction in which the film is transported inside the film image reading apparatus 16. In both scanning sections 36 and 38, scan readings of the image recorded on the negative film 12, as is explained below, are performed.

An insertion detecting sensor 40 is provided at the upstream side of the film transportation path. The insertion detecting sensor 40 is composed of a light-emitting element 40A and a light-receiving element 40B, together forming a pair, disposed facing each other on either side of the film transportation path. The light receiving-element 40B is connected to a control circuit 42. The control circuit 42 determines whether or not a negative film 12 has been inserted in the film transportation path of the film image reading apparatus 16 on the basis of a change in the level of a signal output from the light-receiving element 40B.

A pair of rollers 44 are disposed between the insertion detecting sensor 40 and the prescan section 36 to nip and transport the negative film 12.

The prescan section 36 is provided with a lamp 52 arranged in such a manner as to irradiate light onto the negative film 12 as it passes through the prescan section 36. The lamp 52 is connected via a driver 54 to the control circuit 42 and the size of the voltage supplied from the driver 54 is controlled by the control circuit 42 so that the amount of light emitted from the lamp 52 is kept at a predetermined value. A group of CC filters 56 consisting of three CC filters, namely C (cyan), M (magenta), and Y (yellow), and a light diffusion box 58 are disposed in that order on the light-emitting side of the lamp 52, and on the other side of the film transportation path from these are provided a focussing lens 60 and a CCD area sensor 62.

The amount that each CC filter of the group of CC filters 56 is inserted onto the optical path is adjusted in advance in order to correct any unevenness in the sensitivity of the three colors R, G, B in the CCD area sensor 62. Light which has passed through the group of CC filters 56, the light diffusion box 58, the negative film 12, and the focussing lens 60 in that order is irradiated onto the light-receiving surface of the CCD area sensor 62.

The CCD area sensor 62 in the present embodiment comprises 200 sensor units in the widthwise direction of the negative film 12 and 300 sensor units in the longitudinal direction of the negative film 12 arranged in a matrix pattern. Each sensor unit consists of a sensor for detecting the amount of R light, a sensor for detecting the amount of G light, and a sensor for detecting the amount of B light placed adjacent to each other. Accordingly, the CCD area sensor 62 separates an image into 200×300 pixels, and detects the amount of light transmitted through each pixel.

The focussing lens 60 focuses the light transmitted through the region containing the frame image to be read recorded on the negative film 12 and both edge portions in the widthwise direction of the film onto the light-receiving surface of the CCD area sensor 62.

Figure 4:
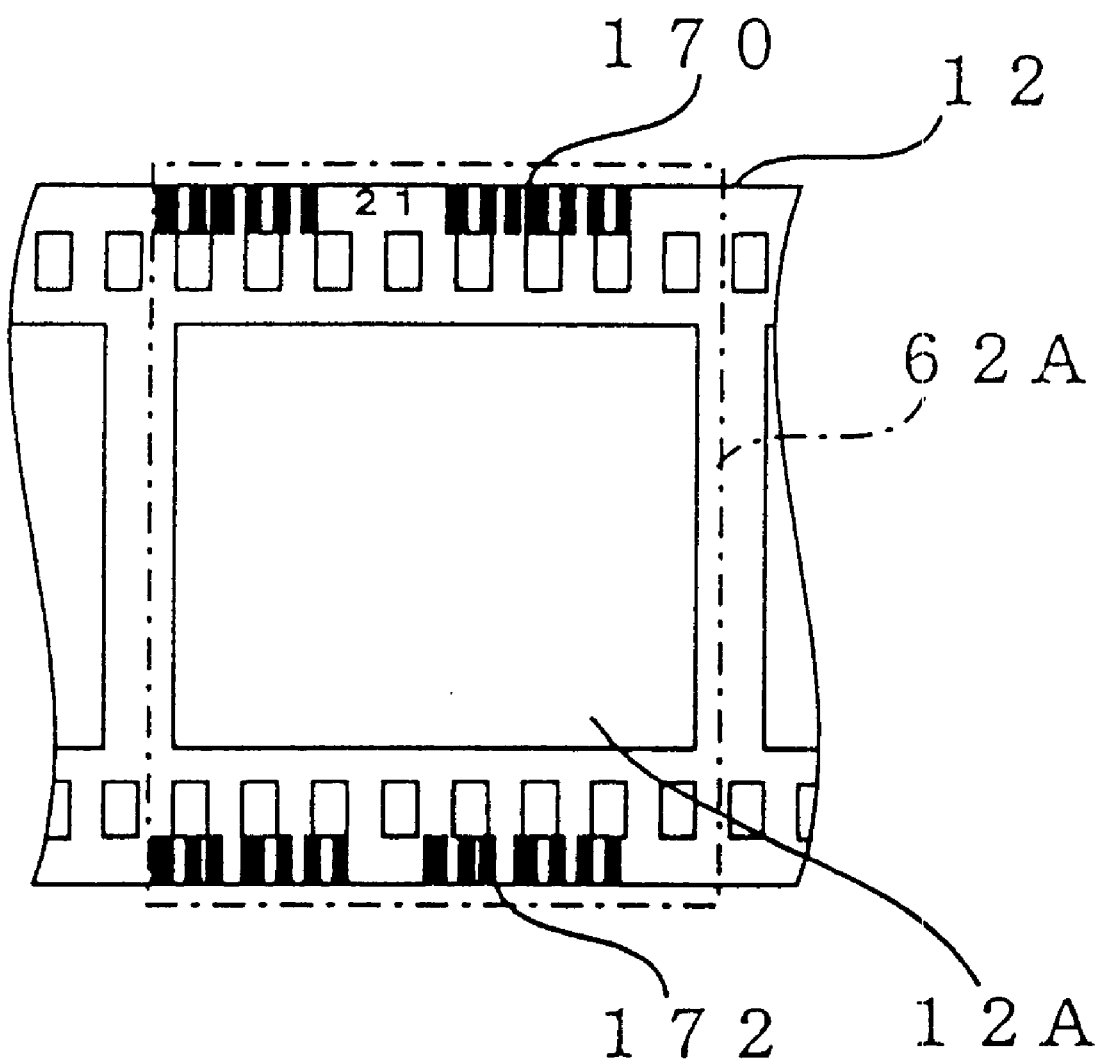
FIG. 4 is a plan view showing the structure of a negative film and the area read by a CCD area sensor.

Accordingly, as is shown in FIG. 4, an image inside the area 62A is able to be read in a single reading. The area 62A is slightly larger in the widthwise direction of the negative film 12 than the width of the negative film 12 and slightly larger in the longitudinal direction of the negative film 12 than one frame image 12A.

An amplifier 64, a LOG converter 66, and an A/D converter 68 are connected in that sequence to the output side of the CCD area sensor 62. A signal output from the CCD area sensor 62 is amplified by the amplifier 64, converted to a logarithm by the LOG converter 66 (converted to a signal level corresponding to the density value), and converted to digital data of the value corresponding to the signal level by the A/D converter 68. The A/D converter 68 is connected to the control circuit 42 and the converted digital data is input into the control circuit 42 as density value data.

Note that the position on the transportation path of the negative film 12 where an image can be read by the CCD area sensor 62 equates to the first reading position of the present invention. In the same way, the lamp 52 equates to the first light source, the CCD area sensor 62 equates to the first image sensor, and the prescan section 36 equates to the first photometric system of the present invention.

A group of rollers consisting of a pair of transporting rollers 74 and a slave roller 76 and a group of rollers consisting of slave rollers 78A, 78B, and 78C are disposed a predetermined distance apart between the prescan section 36 and the fine scan section 38. A loop is formed in the negative film 12 between these two groups of rollers. The loop allows the difference between the speed at which the negative film 12 is transported in the prescan section 36 and the speed at which the negative film 12 is transported in the fine scan section 38 to be absorbed.

A pulse motor 80 is connected to the pair of transporting rollers 74. The pulse motor 80 is connected to the control circuit 42 via a driver 82. The control circuit 42 drives the pulse motor 80 via the driver 82 to transport the negative film 12.

Loop control sensors 83A and 83B are disposed respectively in the vicinity of the upstream side of the pair of transporting rollers 74 and in the vicinity of the downstream side of the slave rollers 78B and 78C. The loop control sensors 83A and 83B in the present embodiment detect markings (e.g. splicing) on the negative film 12. At the moment the loop control sensor 83A detects the markings on the negative film 12 while the negative film 12 is being transported, the control circuit 42 begins counting using an unillustrated counter provided in the control circuit 42. At the moment the same marks are detected by the loop control sensor 83B, the above counting by the unillustrated counter is stopped. On the basis of the count value thus obtained, the length of the loop (the length of the portion of the negative film 12 forming the loop) can be detected (determined).

The fine scan section 38 is constructed almost identically to the prescan section 36. Namely, the fine scan section 38 is provided with a lamp 84 for irradiating light onto the negative film 12. The lamp 84 is connected via a driver 86 to the control circuit 42 and the control circuit 42 controls the size of the voltage supplied from the driver 86 so that the light emitted from the lamp 84 stays at a predetermined amount. A group of CC filters 88, consisting of three CC filters, and a light diffusion box 90 are provided in that order on the light-emitting side of the lamp 84. On the other side of the film transportation path from these are provided a focussing lens 92 and a CCD line sensor 94 in that order.

The amount that each CC filter of the group of CC filters 88 is inserted onto the optical path is adjusted in advance in order to correct any unevenness in the sensitivity of the three colors R, G, B in the CCD line sensor 94. Light which has passed through the group of CC filters 88, the light diffusion box 90, the negative film 12, and the focussing lens 92 in that order is irradiated onto the light-receiving surface of the CCD line sensor 94. The CCD line sensor 94 comprises a multitude of sensor units arranged in a row with a predetermined spacing between each in the widthwise direction of the negative film 12 . Each sensor unit consists of a sensor for detecting the amount of R light, a sensor for detecting the amount of G light, and a sensor for detecting the amount of B light placed adjacent to each other. Note that the CCD line sensor 94 in the present comprises 1000 sensor units (for 1000 pixels) aligned in the widthwise direction of the negative film 12.

Accordingly, the CCD line sensor 94 separates an image into a multitude of pixels (one thousand in the present embodiment), the size of one side of each pixel being the same as the width of the sensor unit, and detects the amount of light transmitted through each pixel. The focussing lens 92 focuses the light, from the light transmitted through the negative film 12, whose optical axis is orthogonal to the optical axis of the light emitted from the lamp 84 and which is transmitted through one row of pixels in the widthwise direction of the negative film 12 onto the light-receiving surface of the CCD line sensor 94.

An amplifier 96, a LOG converter 98, and an A/D converter 100 are connected in that sequence to the output side of the CCD line sensor 94. A signal output from the CCD line sensor 94 is amplified by the amplifier 96, converted to a signal level corresponding to the density value by the LOG converter 98, and converted to digital data by the A/D converter 100. The A/D converter 100 is connected to the control circuit 42 and the converted digital data is input into the control circuit 42 as density value data.

The control circuit 42 is provided with an image buffer 70 which is able to hold the density value data of a plurality of images and the input density value data is stored in the image buffer 70. A CRT display unit 72 is also connected to the control circuit 42 and processing is performed using the input density value data so as to display a positive image on the CRT display unit 72.

The control circuit 42 also calculates the amount of R,G,B exposure onto the printing paper on the basis of density value data. The control circuit 42 is connected to a printer section 110 of a printer processor 18 described below and data indicating the calculated amount of exposure is transmitted to the control circuit 122 of the printer section 110 (see FIG. 3).

Note that the position on the transportation path of the negative film 12 where an image can be read by the CCD line sensor 94 equates to the second reading position of the present invention. In the same way, the lamp 84 equates to the second light source, the CCD line sensor 94 equates to the second image sensor, the fine scan section 38 equates to the second photometric system, the image buffer 70 equates to the storage means, and the control circuit 42 equates to the control means of the present invention.

A pair of transporting rollers 102 are disposed downstream of the fine scan section 38. A pulse motor 104 is connected to the transporting rollers 102. The pulse motor 104 is connected via a driver 106 to the control circuit 42. The control circuit 42 drives the pulse motor 104 via the driver 106, thereby transporting the negative film 12.

Figure 1:
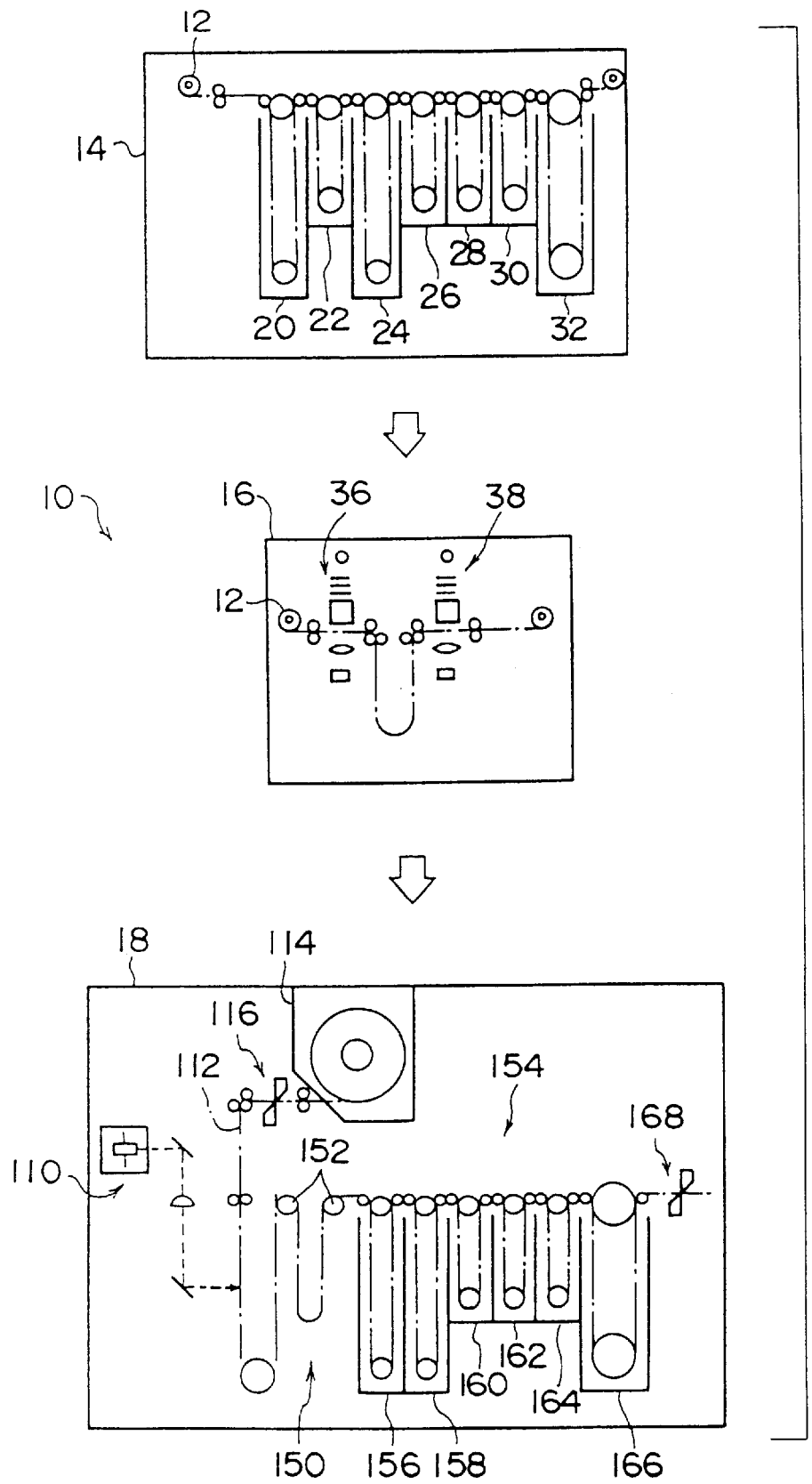
FIG. 1 is a schematic structural diagram of the photographic processing system according to the present embodiment.

A magazine 114 for housing the printing paper 112 wound up in a roll is set in the printer processor 18 (see FIG. 1). The printing paper 112 is pulled out from the magazine 114 and is sent to the printer section 110 via a cutter section 116. When the data on the exposure amount is sent from the control circuit 42 of the film image reading apparatus 16, the printer section 10 performs exposure of the image onto the printing paper 112 on the basis of the exposure amount data.

Figure 3:
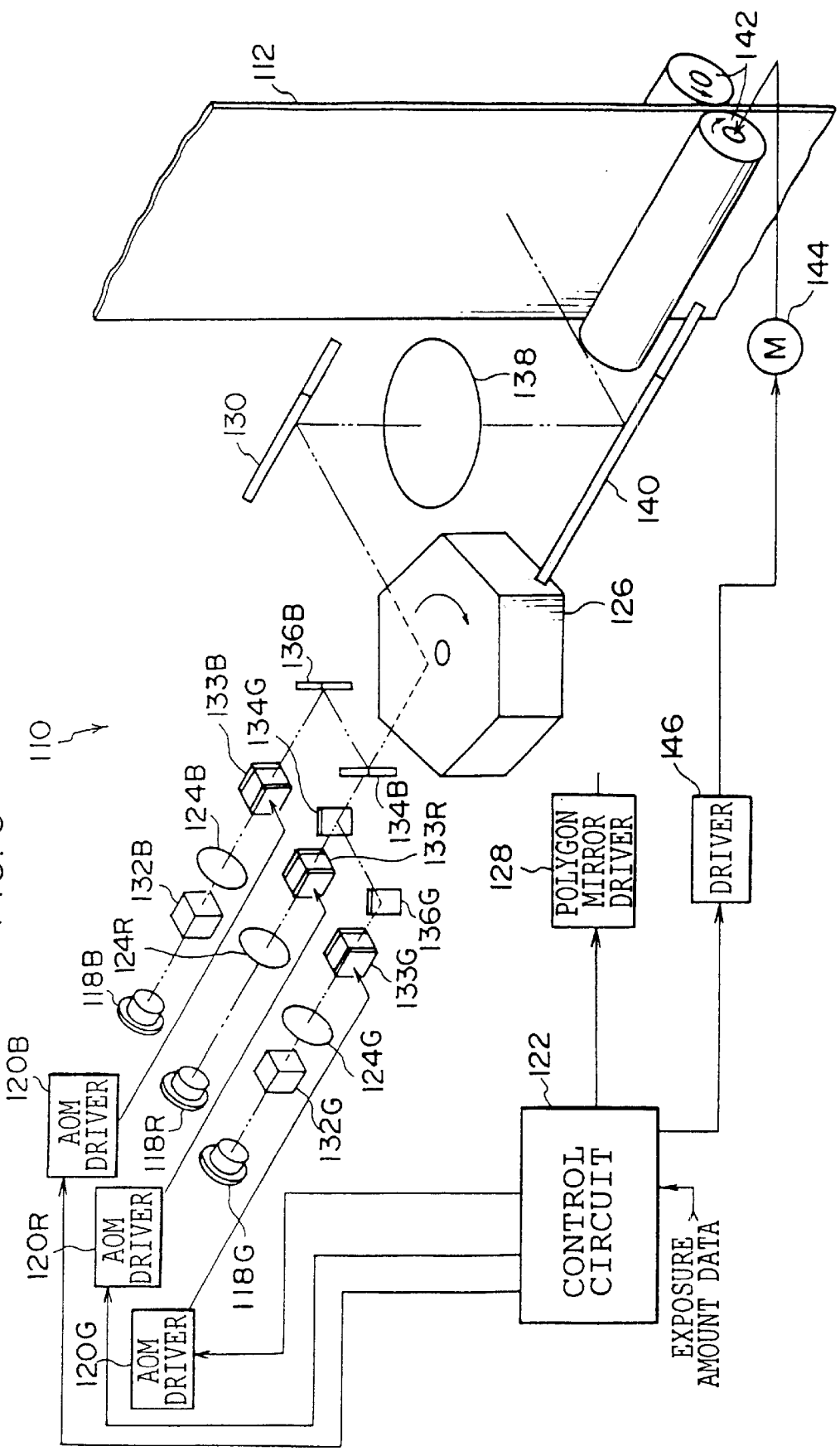
FIG. 3 is a perspective view showing the schematic structure of the printer section.

As is shown in FIG. 3, the printer section 110 is provided with a semiconductor laser 118R for emitting a laser beam having the R wavelength. On the beam-emitting side of the semiconductor laser 118R are provided in the following order: a collimator lens 124R; an acousto-optic modulator (AOM) 133R; a dichroic mirror 134G for reflecting only light of the G wavelength; a dichroic mirror 134B for reflecting only light of the B wavelength; and a polygon mirror 126.

Each AOM 133 is provided with an acousto-optical medium. On facing surfaces of this element are affixed a transducer which outputs ultrasonic waves in accordance with input high frequency signals, and a sound absorbing medium which absorbs the ultrasonic waves which have passed through the acousto-optical medium. The AOM 133R transducer is connected to the AOM driver 120R, and when a high frequency signal is input from the AOM driver 120R, the AOM 133R transducer diffracts one laser beam from the incident laser beams and emits this laser beam as a recording laser beam. This recording laser beam is irradiated onto the polygon mirror 126 via dichroic mirrors 134G and 134B.

Figure 10:
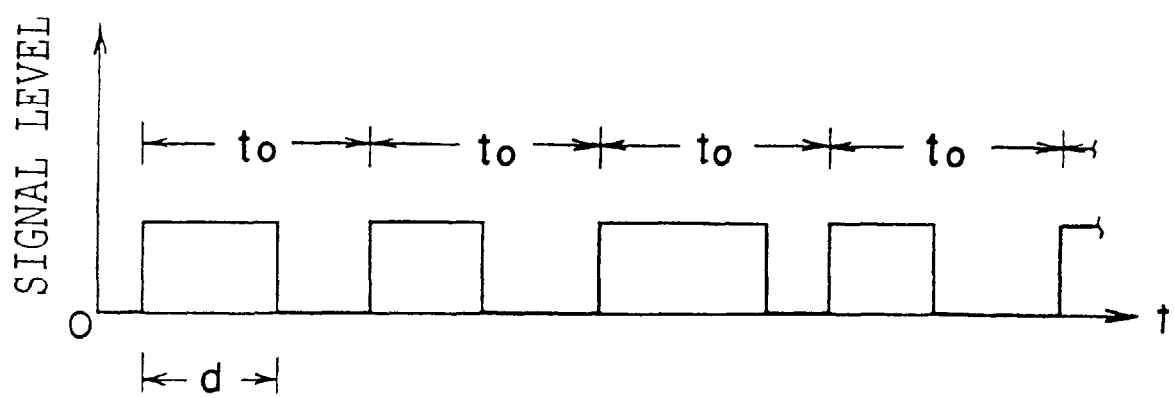
FIG. 10 is a line drawing representing the wave form of an exposure amount control signal output to an AOM driver.

The AOM driver 120R is connected to the control circuit 122. The control circuit 122 outputs an exposure amount control signal which accords with the R exposure amount data from the input exposure amount data to the AOM driver 120R. The exposure amount control signal is a cyclic to pulse signal as is shown in FIG. 10, and the pulse width d is altered in accordance with the amount of exposure for each pixel in the above-described R exposure amount data. The AOM driver 120R outputs a high frequency signal to the AOM 133R when the level of the input exposure amount control signal is high, and together with this, a recording laser beam is emitted from the AOM 133R. Accordingly, the amount of light of the R wavelength laser beam irradiated onto the printing paper 112 is altered for each cycle to on the basis of the R exposure amount data.

The printer section 110 is provided with semiconductor lasers 118G and 118B for emitting laser beams of a predetermined wavelength. A wavelength converting element (converter) 132G, a collimator lens 124G, an AOM 133G, and a total reflection mirror 136G are disposed in that sequence on the beam-emitting side of the semiconductor laser 118G. The AOM 133G is connected via an AOM driver 120G to the control circuit 122. The control circuit 122 outputs an exposure amount control signal to the AOM driver 120G in accordance with the G exposure amount data. The AOM driver 120G outputs a high frequency signal when the exposure amount control signal is at a high level in the same way as the AOM driver 120R.

The laser beams emitted from the semiconductor laser 118G are thus converted to G wavelength by the wavelength converting medium 132G and irradiated onto the AOM 133G. When a high frequency signal is input by the AOM driver 120G, a recording laser beam is emitted from the AOM 133G, reflected by the total reflecting mirror 136G, reflected by the dichroic mirror 134G, and is superposed with the laser beam emitted from the semiconductor laser 118R.

A wavelength converting medium 132B, a collimator lens 124B, an AOM 133B, and a total reflection mirror 136B are disposed in that sequence on the beam-emitting side of the semiconductor laser 118B as well. The AOM 133B is also connected via an AOM driver 120B to the control circuit 122. The control circuit 122 outputs an exposure amount control signal to the AOM driver 120B in accordance with the B exposure amount data. Laser beams emitted from the semiconductor laser 118B are converted to B wavelength by the wavelength converting medium 132B and irradiated onto the AOM 133B. When a high frequency signal is input by the AOM driver 120B, a recording laser beam is emitted from the AOM 133B, reflected by the total reflecting mirror 136B, reflected by the dichroic mirror 134B, and is superposed with the laser beams emitted from the semiconductor laser 118R and the semiconductor laser 118G.

The laser beams which have been superposed by the dichroic mirrors 134G and 134B are irradiated onto the polygon mirror 126. The polygon mirror 126 is connected via a polygon mirror driver 128 to the control circuit 122 and is driven by the polygon mirror driver 128 to rotate at a speed controlled by the polygon mirror driver 128. The laser beams irradiated onto the polygon mirror 126 are emitted in a successively changing direction by the rotation of the polygon mirror 126 and are scanned in the horizontal direction in FIG. 3. A mirror 130 is disposed on the laser beam-emitting side of the polygon mirror 126. The laser beams reflected by the polygon mirror 126 are reflected in the downwards direction in FIG. 3 by the mirror 130.

A scanning lens 138 and a mirror 140 are provided in sequence on the laser beam-emitting side of the mirror 130. Laser beams reflected by the mirror 130 are transmitted through the scanning lens 138 and are reflected by the mirror 140. Printing paper 112 is provided on the laser beam-emitting side of the mirror 140 with the longitudinal direction of the printing paper 112 matching the vertical direction in FIG. 3. Laser beams reflected by the mirror 140 are irradiated onto the printing paper 112. A pair of transporting rollers 142 for nipping and transporting the printing paper 112 are provided below the position where the laser beam is irradiated onto the printing paper 112 transportation path. A pulse motor 144 is connected to the pair of transporting rollers 142. The pulse motor 144 is connected via a driver 146 to the control circuit 122. The control circuit 122 drives the pulse motor 144 via the driver 146, so that the printing paper 112 is transported in the downwards direction in FIG. 3.

As is shown in FIG. 1, the printing paper 112 which has passed through the printer section 110 is fed to a reservoir section 150. The reservoir section is provided with a pair of rollers 152 spaced a predetermined distance apart and the printing paper 112 forms a loop between the pair of rollers 152. This loop absorbs the difference between the speed at which the printing paper is transported in the printer section 110 and the speed at which the printing paper is transported in the processor section 154 downstream from the printer section 110. A color developing tank 156, a bleaching fixing tank 158, and washing tanks 160, 162, and 164 are provided in sequence in the processor section 154. A predetermined processing solution is stored inside each of these processing tanks. The printing paper 112 is fed through each of the tanks in sequence and submersed in each of the processing solutions therein, to thus be processed.

A drying section 166 is provided downstream of the processor section 154. In the drying section 166, warm air generated by an unillustrated fan and heater is supplied to the printing paper 112. This enables water adhering to the surface of the printing paper 112 to be dried. The printing paper 112 which has passed through the drying section 166 is cut into the respective photographic prints by a cutter 168 which are then ejected from the printer processor 18.

As is shown in FIG. 4, a bar code 170 indicating the frame number and a bar code 172 indicating the DX code (A code which indicates the sensitivity of the film as well as the maker of the film) is recorded for each frame image 12A on both edges in the widthwise direction of the negative film 12 (the direction orthogonal to the direction in which the negative film 12 is transported), which is the object to be read of the present embodiment.

Next will be explained the main functions of the film image reading apparatus 16 of the present embodiment with reference to Table 1.

TABLE 1

| Application | Necessary Specifications | |
| --- | --- | --- |
| | Number of pixels | Dynamic range |
| Prescan | | |
| Detect position of frame image | more than or equal to approximately 10 × 100 × 3 colours | Satisfactory at a photometric accuracy employing fixed reading conditions |
| Determine photometric conditions for fine scan | more than or equal to approximately 20 × 30 × 3 colours | Satisfactory at a photometric accuracy employing fixed reading conditions |
| Fine Scan | | |
| Acquire image data for printing | more than or equal to approximately 1000 × 1500 | High level of accuracy required to be reflected in image quality of print |
| Execute auto setup process | more than or equal to approximately 20 × 30 × 3 colours | Linearity equivalent to fine scan required |
| Examine positive image | more than or equal to approximately 200 × 300 × 3 colours | High level of accuracy required for displaying quality identical to print |

The determining of the "Determine fine scan photometric condition" in Table 1 is a determining of the amount of light from the lamp 84 and of the charge accumulation time of the CCD line sensor 94 during the fine scan which is made on the basis of the density value data obtained by the prescan. For example, the photometric condition during the fine scan are determined so that the higher the value of the density value data obtained by the prescan, the greater the amount of light from the lamp 84 and the longer the charge accumulation time of the CCD line sensor 94.

The auto setup process of the "Perform auto setup process" in Table 1 corresponds to the image processing according to the second and third aspects of the present invention. The auto setup process of the present embodiment determines the density classification of the frame image and obtains and stores the processing condition of the image processing for the density value data obtained by the fine scan on the basis of the above density classification.

The positive image examination (inspection) of the "Examine positive image" in Table 1, by converting the image data obtained by the above fine scan section 38 from a negative image into a positive image and displaying the resultant image on a CRT display unit 72, is referring (inspecting) to the displayed image. The operator is able, for example, to indicate corrections such as those of color and density for the amount of exposure.

Note that in the prescan of the present embodiment, various types of detection which are not shown in Table 1, such as frame image size detection, frame number detection, DX code detection, and unneeded frame image detection can be performed.

As stated above, a bar code 170 indicating the frame number and a bar code 172 indicating the DX code is recorded on both edges in the widthwise direction of the negative film 12 which is the object to be read of the present embodiment for every frame image 12A thereof (see FIG. 4). Moreover, because the density value data obtained from the prescan section 36 contains not only density value data for the frame image 12A, but also for the bar codes 170 and 172, the aforementioned frame number detection and DX code detection can be achieved by referring to the density value data for the positions of the bar codes 170 and 172.

Images which fall into the category of unneeded frame images include images where the focussing of the main object in the image has been blurred (known as blurred focussing), and images where extreme underexposure or overexposure have occurred to the extent where the state of the main object cannot be determined. Note that the existence of the above blurred focus image can be determined by, for example, the presence or absence of high range frequency in the image data (the absence of high range frequency means that blurred focussing is determined). Moreover, an extremely overexposed or underexposed image can be determined by, for example, the size of the average value of the density value data of the frame image which is to be read.

On the basis of the above explanation, each of the processings performed on the basis of image data (density value data) obtained in the prescan section 36 and the fine scan section 38 are summarized in Table 2 below.

TABLE 2

| Prescan Section | Fine Scan Section |
|---|---|
| 1. Detect position of frame image. | 1. Acquire image data for printing. |
| 2. Determine fine scan photometric conditions. | 2. Perform auto setup process. |
| 3. Detect size of frame image. | 3. Perform positive image examination. |
| 4. Detect frame number. | |
| 5. Detect DX code. | |
| 6. Detect unneeded film images. | |

Note that each of the processes described in Table 2 as being performed on the basis of density value data obtained by the prescan section 36 are processes having the level of accuracy in which, even if density value data of a comparatively low level of detail obtained by prescanning under fixed photometric condition (the amount of light from the lamp and the charge accumulation time of the CCD sensor) is used, no problems are generated. Further, with respect to the level of resolution, the auto setup process and examination of the positive image may be performed with no problems on the basis of the density value data obtained by the prescan section 36, however, it is preferable that with respect to the linearity of the density value data, the linearity of the density value data be approximately the same as the linearity of the density value data obtained by the fine scan section 38, and therefore the auto setup process and the examination of the positive image are allocated to the processes performed by the fine scan section 38.

The operation of the present embodiment will now be explained. The negative film cartridge 12 set in the film processor 14 is fed through each of the processing tanks and is then fed to the drying section 32. In this way, color developing, bleaching, bleach fixing, washing, stabilizing and drying processes are all performed. Accordingly, a latent image recorded by a camera can be visualized. The negative film 12 processed in the film processor 14 is set in the film image reading apparatus 16.

The operation of the prescan section 36 of the film image reading apparatus 16 will now be explained with reference to the flow charts in FIGS. 5 and 6.

Figure 5:
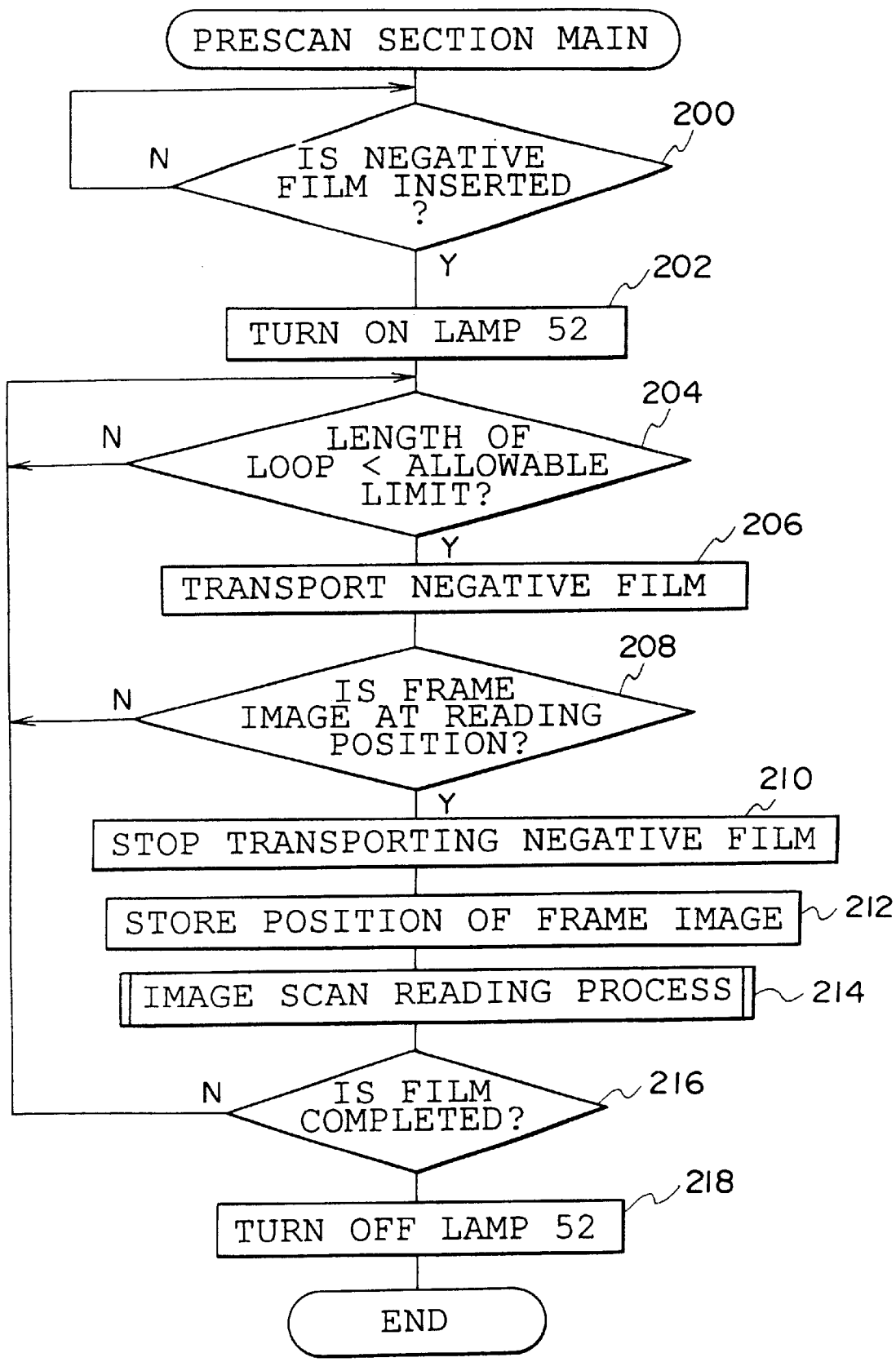
FIG. 5 is a flow chart explaining the main routine of the film image reading apparatus prescan section.
Figure 6:
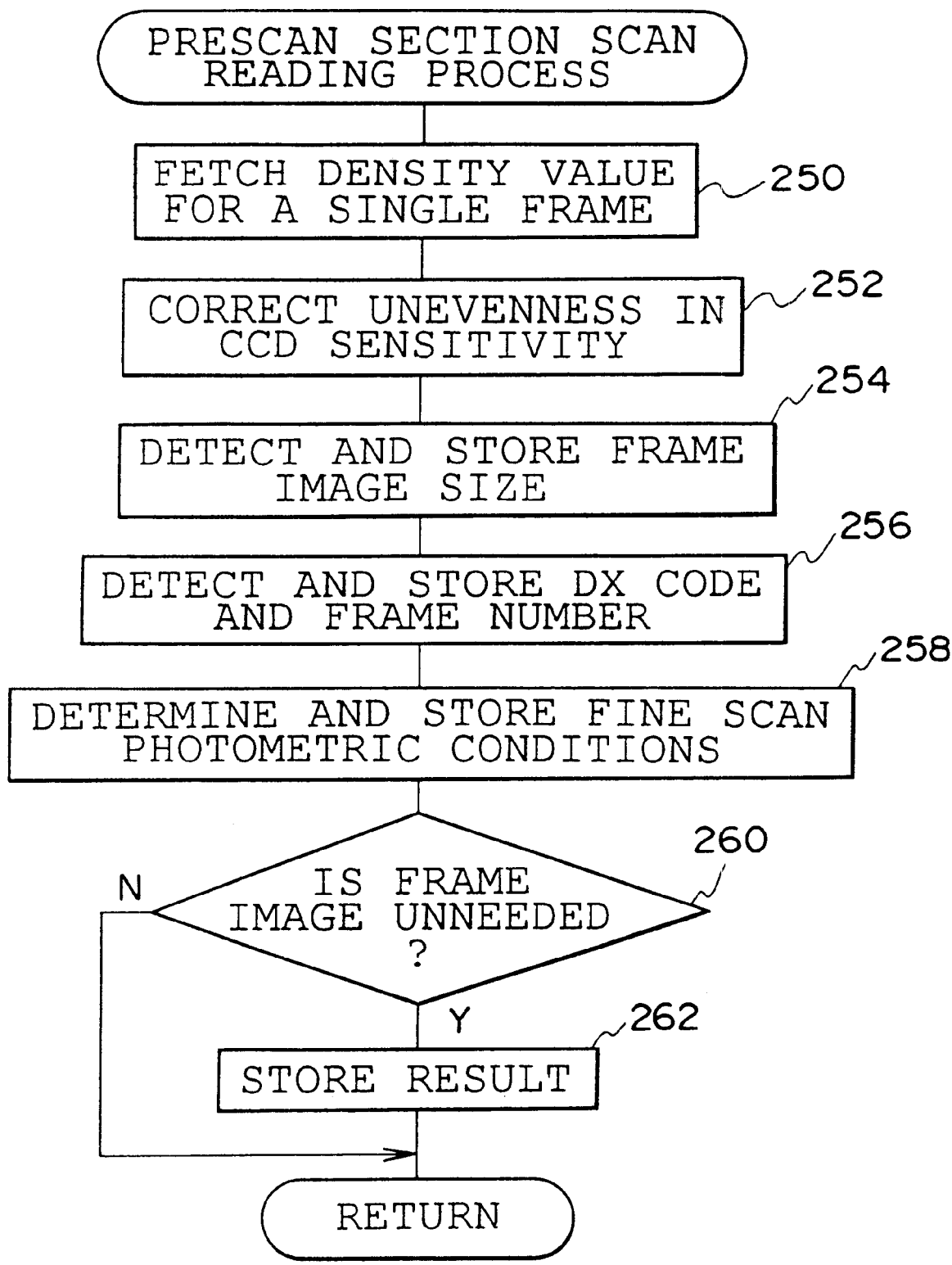
FIG. 6 is a flow chart explaining the scan reading process performed in the prescan section.

In step 200 in FIG. 5, whether or not the negative film 12 is inserted in the film image reading apparatus 16 is determined on the basis of a signal input from an insertion detection sensor 40. If it is determined that the negative film 12 is inserted in the film image reading apparatus 16, the determination of step 200 is affirmative and the routine proceeds to step 202.

In step 202 a lamp 52 is lit by a driver 54. At this time the amount of light of the lamp 52 is set in advance as a fixed amount, and because no mechanism is required to adjust the amount of light, the structure of the driver 54 can be simplified.

In step 204, the length of a loop between the prescan section 36 and the fine scan section 38 is detected on the basis of a signal output from loop management sensors 83A and 83B and a determination is made as to whether or not the length of the loop is smaller than a predetermined allowable value. If the loop is not smaller than the allowable value, then the routine enters a waiting state until the loop is smaller than the allowable value.

Namely, if, for example, the processing of the fine scan section 38 is slower than the processing of the prescan section 36, the length of the loop gradually increases as time passes and exceeds the above predetermined allowable value. At that point, in step 204, when the length of the loop has exceeded the allowable value, the operation of the prescan section 36 is temporarily halted.

When the length of the loop is within the allowable value, namely when an affirmative judgement is made in step 204, the routine proceeds to step 206 where the transportation of the negative film 12 is begun.

In the next step 208, a determination is made as to whether or not the frame image has reached a predetermined image reading position, more specifically, a determination is made as to whether or not the frame image to be read is within the range which is readable by the CCD area sensor 62. Because the negative film 12 has unexposed areas which are in a completely blank state between each frame image, the density value data output from the CCD area sensor 62 and input to the control circuit 42 undergoes dramatic changes at the edges of the film image (the front edge and rear edge of a film image in the direction in which the negative film 12 is transported). Accordingly, on the basis of the position where the density value data changes dramatically, a determination can be made as to whether or not the frame image has reached the above-described predetermined image reading position.

If the determination in step 208 is that the frame image has not reached the image reading position (i.e. the determination is negative), the routine returns to step 204 and the processes of steps 204 to 208 are repeatedly performed until the frame image does reach the image reading position, at which point the routine proceeds to step 210.

In step 210, the transportation of the negative film 12 is halted, and in the next step 212, the position of the frame image to be read is stored in an unillustrated storage section provided in the control circuit 42. Namely, because the frame image to be read is positioned at this point at the image reading position of the prescan section 36, the position of the frame image is determined corresponding to the position of perforations and the like provided in the negative film 12 on the basis of the position at this point of the edge of the frame image to be read. The position of the frame image is stored in the above-described unillustrated storage section.

When the storage of the position of the frame image has been completed, then, in the next step 214, the process for scan reading the image (described below) is performed. A determination is made in the subsequent step 216 as to whether or not processing has been completed for all the frame images recorded on the negative film 12. If the determination of step 216 is negative, the routine returns to step 204 and the above processings are repeatedly performed. At the point where the determination in step 216 is affirmative, the routine proceeds to step 218 where the lamp 52 is extinguished and the this processings are completed.

As explained above, when the length of the above-described loop is within the allowable value, the prescan section 36 performs each of the image processings in sequence for each individual frame image, namely, storing the position of each frame image to be read, scan reading the image.

The scan reading process in the prescan section 36 (the process performed in step 214 of FIG. 5) will now be explained in detail with reference to the flow chart in FIG. 6. Note that the frame image is positioned at the image reading position each time this process is performed. Note also that the light emitted from the lamp 52 which has passed through the CC filters 56, the light diffusion box 58, and the negative film 12 is focussed onto the light-receiving surface of the CCD area sensor 62 by the focussing lens 60. The signal consequently output from the CCD area sensor 62 is amplified by the amplifier 64, converted to a level corresponding to the density value by a LOG converter 66, and converted into digital data by an A/D converter 68 and is held. The linearity of the density value data obtained in the prescan section 36 is not as necessary as the linearity of the density value data obtained in the fine scan section 28, and consequently the charge accumulation time at this time of the CCD area sensor 62 is fixed at a comparatively short time.

In step 250, the density value data for each individual frame image is fetched from the A/D converter 66, and, in the next step 252, the fetched image data is corrected in accordance with the unevenness in the sensitivity of each of the plurality of sensor units arranged in a matrix formation.

In the next step 254, the frame image size is detected on the basis of the density value data corrected in step 252 and is stored in the above unillustrated storage section. Note that if the negative film to be read is a 135 size negative film, the size of the frame image (in this case, the size of the frame of the frame image) is determined on the basis of whether or not the density and color tint of a predetermined portion (for example, a portion inside the image recording range in the case of a standard sized frame image, and a portion outside the image recording range in the case of a non-standard sized frame image, such as a panorama sized frame image) correspond to the density and color tint of unexposed portions (blank areas).

Moreover, as disclosed in Japanese Patent Applications Laid-Open (JP-A) Nos. 8-304932, 8-304933, 8-304934, and 8-304935, on the basis of the density value data for each pixel obtained from the prescan, each the value of the change in the density across the widthwise direction of the film for each pixel are computed, and the values of the change in density in the widthwise direction of the film for each pixel in unit of line running in the longitudinal direction of the film are accumulated. The size of the film image (the aspect ratio) may then be determined by comparing the accumulated values of each line. The size of the film image (aspect ratio) may also be determined on the basis of the abundance ratio of the image in each of region in the image by determining the threshold value from the density histogram and binarizing the image, or by a combination of both the above methods.

In the next step 256, the DX code and frame number are detected on the basis of the density value data which corresponds to the areas of the bar codes 170 and 172 recorded on both edges in the widthwise direction of the negative film 12. In the next step 258, the optimum photometric condition (i.e. the amount of light from the lamp 84 and the charge accumulation time of the CCD line sensor 94) for the fine scan by the fine scan section 38 are determined on the basis of the density value data which corresponds to the area of the frame image to be read, and these optimum photometric condition are then stored in the unillustrated storage section.

Note that in the present embodiment, the minimum value of the density value data is extracted and the optimum amount of light for the lamp 84 and charge accumulation time for the CCD line sensor 94 in the fine scanning section 38 are computed for the read frame image on the basis of the minimum value of the density value data, and then stored. This is because when the minimum value of the density value data is extremely small, there is the fear that the level of the output signal from the CCD line sensor 94 is saturated when the image is read in the fine scan section 38.

In the next step 260, a determination is made as to whether or not the frame image to be read is an unneeded frame image (e.g. a blurred image, an extremely overexposed image, or an extremely underexposed image) on the basis of the density value data corresponding to the reason of the frame image to be read. If the frame image to be read is an unneeded frame image, then, in step 262, that fact is stored and the main scan reading process is completed.

Figure 7:
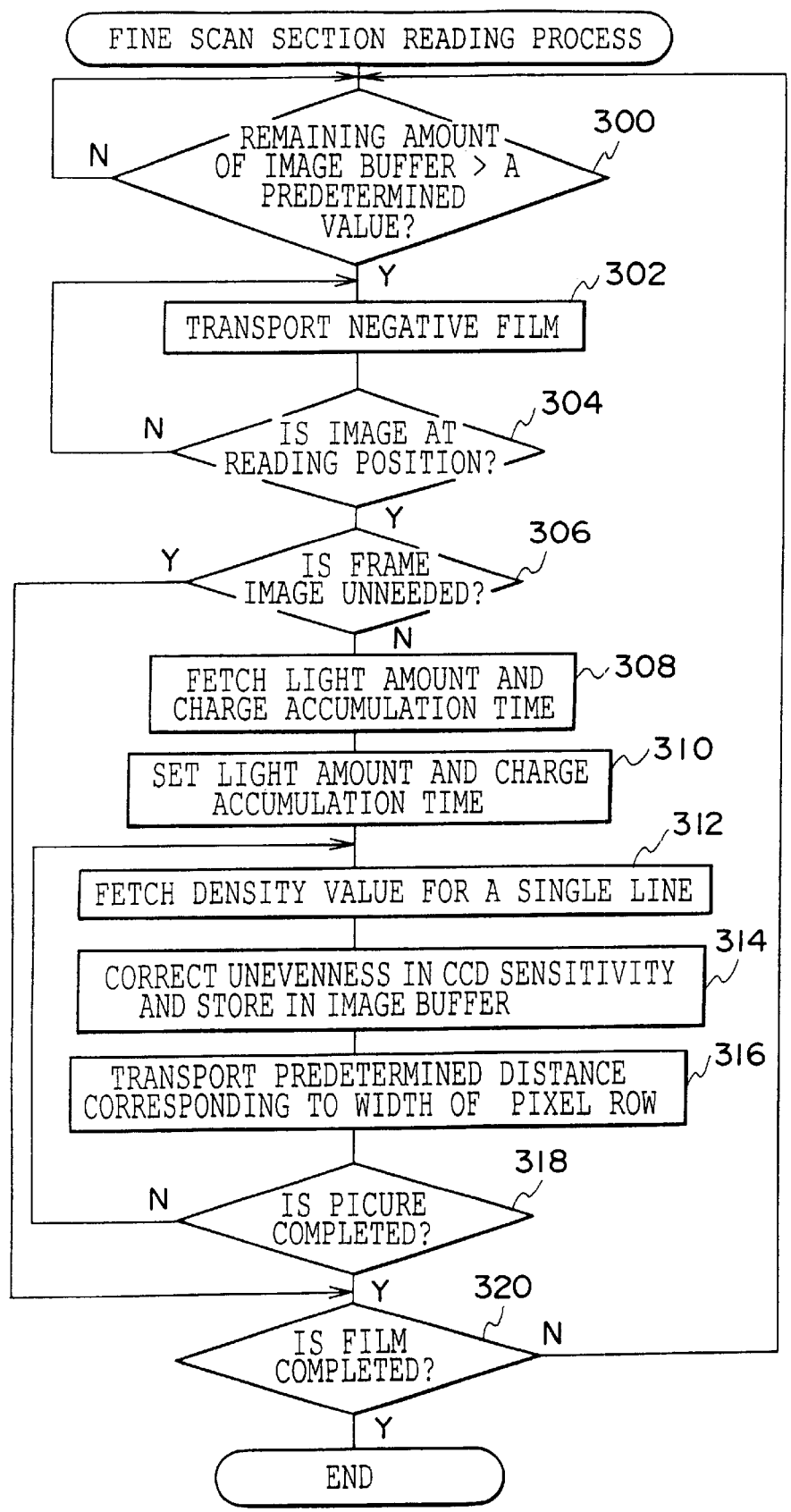
FIG. 7 is a flow chart explaining the reading process performed in the fine scan section of the present embodiment.

Next the image reading process in the fine scan section 38 will be explained with reference to the flow chart shown in FIG. 7.

In step 300, a determination is made as to whether or not the remaining capacity of the image buffer 70 is greater than a predetermined value. If it is not greater than a predetermined value (if the determination made in step 300 is negative), the routine enters a waiting state until the value is greater than the predetermined value. Namely, because the density value data obtained in the process described below is stored sequentially in the image buffer 70, the remaining capacity of the image buffer 70 gradually decreases with time. If the remaining capacity continues to decrease, ultimately storage of the density value data in the image buffer 70 becomes impossible and, in the worst case, the entire device stops. Checking the remaining capacity of the image buffer 70 in step 300 allows this problem to be avoided.

In the next step 302, transportation of the negative film 12 is begun and a determination is made by the CCD line sensor 94 in the next step 304 as to whether or not the leading row of pixels of the image has reached the image reading position. If the determination in step 304 is negative, the routine returns to step 302 and the processes of steps 302 and 304 are repeated and the transportation of the negative film 12 is resumed until the determination in step 304 is affirmative. Note that the determination in step 304 is made on the basis of the position of the frame image stored in the unillustrated storage section in step 212 above (see FIG. 5).

When the determination in step 304 is affirmative, the routine proceeds to step 306. In step 306, a determination is made as to whether or not the frame image to be read in the fine scan is an unneeded frame image by referring to the information, stored in the unillustrated storage section through the processes of the above steps 260 and 262, indicating an unneeded frame image or not. If the frame image is an unneeded frame image, the routine proceeds to step 320 described below. If the frame image is not an unneeded frame image, the routine proceeds to step 308.

In step 308, the optimum amount of light of the lamp 84 and the charge accumulation time of the CCD line sensor 94 obtained in the prescan section 36 and stored are fetched. In the next step 310, the voltage supplied to the lamp 84 is controlled to a level in accordance with the above-described optimum light amount. At the same time, the charge accumulation time of the CCD line sensor 94 is set at the charge accumulation time fetched in step 308. Note that the amount of light from the lamp 84 can also be controlled by changing the amount that each CC filter of the group of CC filters 88 is inserted into the optical path. Further, when the above charge accumulation time is set, if the set charge accumulation time exceeds the time that the negative film 12 is transported a distance of one pixel by the pulse motor 104, then it is necessary to alter the speed at which the negative film 12 is transported by the pulse motor 104 (i.e. the longer the charge accumulation time, the faster the speed at which the negative film 12 is transported).

After the processes of step 310 have been completed and after a short interval until the amount of light from the lamp 84 has stabilized, the routine proceeds to step 312. In steps 312 to 318, the process of reading the image is performed.

Namely, in step 312, the density value data for a single row of pixels is fetched from the A/D converter 100 and, in the next step 314, the fetched density value data is corrected in accordance with the sensitivity unevenness of each of the plurality of sensor units of the CCD line sensor 94, the corrected data is then stored in the image buffer 70.

In the next step 316, the pulse motor 104 is driven via the driver 106 so that the negative film 12 is transported by a predetermined amount corresponding to the interval (width) of row of pixels. Note that this amount the negative film 12 is transported corresponds to the width of sensor unit. Accordingly, in the fine scan section 38, the image is separated into a plurality of more minute pixels than in the prescan section 36 and the amount of light passing therethrough is measured.

In the next step 318, a determination is made as to whether or not the reading of a single entire frame image has been completed. If the determination in step 318 is negative, the routine returns to step 312 and the processes of steps 312 through 318 are repeated until the determination in step 218 is affirmative. By this routine the R image data, the G image data, and the B image data of a single frame image are stored in the image buffer 70.

In the next step 320, a determination is made as to whether the density value data of all the frame images recorded on the negative film 12 have been stored in the image buffer 70. If the determination in step 320 is negative, the routine returns to step 300 and steps 300 through 320 are repeated. If the determination in step 320 is affirmative, the routine is completed.

Figure 8:
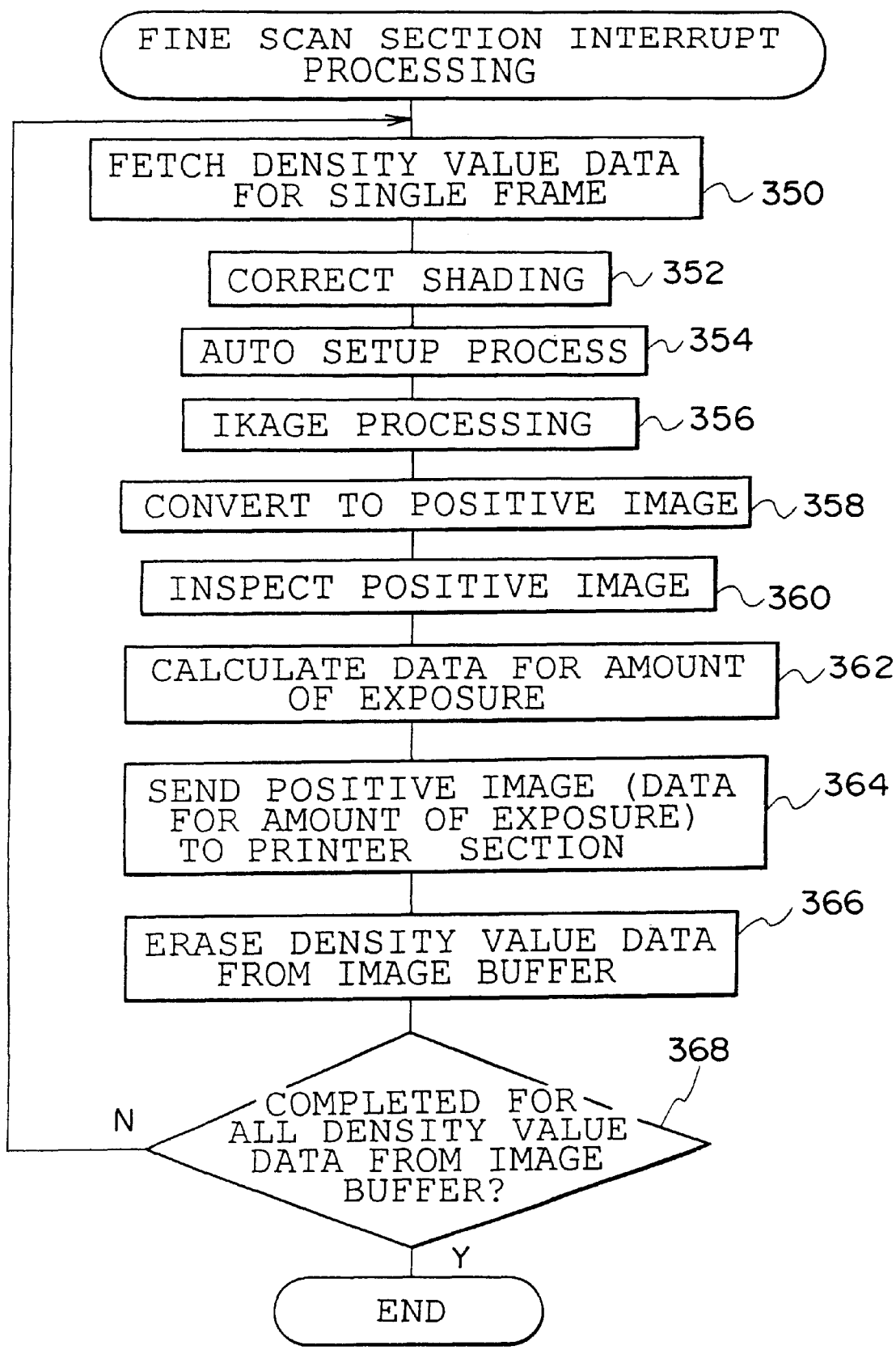
FIG. 8 is a flow chart explaining the interrupt processing performed in the fine scan section of the present embodiment.

An explanation will now be given, with reference to the flow chart of FIG. 8, of the interrupt processing performed by the fine scan section 38 when density value data for at least one frame image is stored in the image buffer 70. Note that the auto setup process which automatically sets the image processing condition for processing the image density value data obtained by the fine scan section 38, and the positive image examination of the frame image represented by the density value data obtained by the fine scan section 38 are performed in the interrupt processing.

Firstly, in step 350, the density value data for a single frame image is fetched from the image buffer 70. In the next step 352, shading correction is performed. This is performed because the distribution of the light emitted from the lamp 84 is such that the amount of light is gradually attenuated the further away towards the periphery from the position of the optical axis which has the peak amount of light. In this step 352, the density value data fetched from the image buffer 70 is corrected in accordance with the distribution of the amount of light from the lamp 84 measured previously.

In the next step 354, the density classification of the frame image is automatically determined on the basis of the density value data which shading correction was performed in step 352. On the basis of this density classification, the auto setup process is performed which obtains the processing condition for the image processing for the density value data and stores the processing condition.

The average density, maximum density, and minimum density and so on of the frame image is compared with predetermined values set in advance. This enables the density of the frame image to be classified as e.g. low density, normal density, high density, or very high density. Image processing condition include enlargement/reduction ratio of the image, hypertone and hyper-sharpness image processing condition (specifically, the degree of compression of the gradation of the extreme low frequency luminance component of an image, and the level of gain of the high frequency and medium frequency components of an image), and gradation conversion conditions.

Once the auto setup process has been completed, then, in the next step 356, image processing (image enlargement/reduction, gradation conversion, hypertone processing, and hyper-sharpness processing) is performed on the density value data in accordance with the image processing condition obtained from the above auto setup process. In the next step 358, the density value data after image processing is converted to positive image data. In the next step 360, a positive image is displayed on the CRT display unit 72 on the basis of the positive image data. An operator is then able to examine the positive image for indications of the need to correct, for example, the color or density of the image by referring to the displayed image. In the examination of the positive image, when there is an indication from the operator of the need for some type of correction, the correction in accordance with the indication is performed on the above-described density value data. Note that the positive image data used for displaying the positive image on the CRT display unit at this time is data obtained from the fine scan section 38 and the resolution thereof is too high to be displayed on the CRT display unit 72 and therefore the positive image data used is thinned for predetermined pixels. Moreover, the positive image data is corrected so that the appearance of the image displayed on the CRT display unit 72 at this time match as much as possible the image output by the printer processor 18.

In the next step 362, by exponentially converting the positive image data (i.e. the data which has not been thinned for displaying on the CRT display) after the examination of the positive image in step 360, the exposure amount data which indicates the amount of R, G, B exposure of each pixel is obtained. In the next step 364, the exposure amount data, computed as described above, is transmitted to the control circuit 122 of the printer section 110. In the next step 366, the density value data corresponding to the exposure amount data transmitted from the image buffer 70 to the printer section 110 is deleted.

In the next step 368, it is determined whether or not each of the processes performed on all of the density value data stored in the image buffer 70 in the above-described steps 350 to 366 has been completed, i.e. such as the auto setup process, the examination of the positive image, and the transmission of the exposure amount data to the printer section 110. If the processes have not been completed, the routine returns to step 350 and after the above processes have been repeatedly performed, the interrupt processing is completed.

Figure 9:
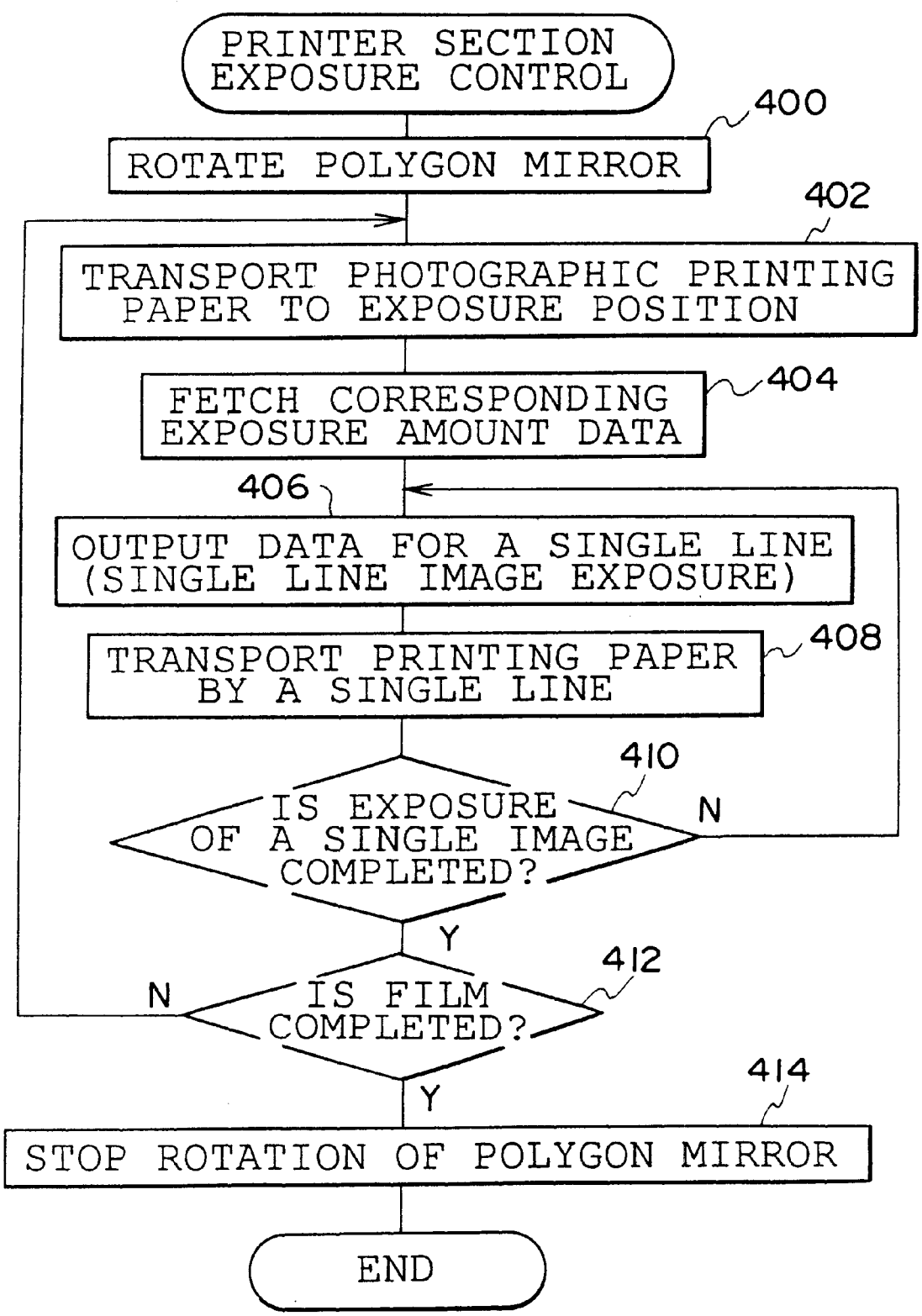
FIG. 9 is a flow chart explaining the exposure process performed in the printer section.

The exposure control process in the printer section 110 will now be explained with reference to the flow chart shown in FIG. 9. In step 400, the rotation of the polygon mirror 126 is started. In step 402, the printing paper 112 is transported via the pulse motor 144, and the unexposed portion of the printing paper 112 is positioned at the exposure position. In step 404, the exposure amount data corresponding to the image to be exposed is fetched. In the next step 406 and subsequent steps, the image is exposed onto the printing paper. Namely, in step 406, an exposure amount control signal in accordance with the R exposure amount data for the first line, an exposure amount control signal in accordance with the G exposure amount data for the first line, and an exposure amount control signal in accordance with the B exposure amount data for the first line, are output from the fetched exposure amount data respectively to an AOM driver 120R, an AOM driver 120G, and an AOM driver 120B.

When the level of each of the exposure amount control signals input to the AOM drivers 120R, 120G, and 120B are of a high level, a high frequency signal is output to each AOM 133R, 133G, and 133B. Accordingly, the recording laser beams are only emitted from each of the AOM 133R, 133G, and 133B for a length of time which accords with the pulse width d, at each the pulse cycle $t_o$, of each of the exposure amount control signals. The recording laser beams are then superposed by the dichroic mirrors 134G and 134B and irradiated onto the polygon mirror 126.

The laser beam irradiating position on the printing paper 112 is moved in sequence by the rotation of the polygon mirror 126, however, the pulse cycle $t_o$ of the above exposure amount control signal is determined so that the amount of movement of the laser beam irradiating position at the pulse cycle $t_o$ corresponds to the width of an image pixel recorded on the printing paper 112. Accordingly, the laser beam irradiating time for each pixel is varied by the pulse width d, and therefore the amount of exposure varies for each pixel in accordance with the exposure amount data. The laser beam reflected by the polygon mirror 126 is further reflected by the mirrors 130 and 140 and irradiated onto the printing paper 112. A single scanning of the laser beam by the polygon mirror 126 performs the exposure of a single row of pixels (of a single line) onto the printing paper 112.

Once the exposure of a single line has been performed, the routine proceeds to step 408. In step 408, During this time that the angle of rotation of the polygon mirror 126 becomes an angle that the incident laser beam is reflected to the scan start position by the polygon mirror 126, the printing paper 112 is transported a predetermined distance which corresponds to the width of a single line by the pulse motor 144. In the next step 410, a determination is made as to whether or not the exposure of a single image has been completed. If the determination in step 410 is negative, the routine returns to step 406 and an exposure amount control signal in accordance with the exposure amount data for the next line is output to each of the AOM drivers 120R, 120G, and 120B, and exposure of the next line is performed in the same way as described above.

By repeating the processes of steps 406 through 410, image exposure is performed in accordance with the above exposure amount data. When the process of exposing a single image is completed, the determination in step 410 is affirmative and the routine proceeds to step 412. In step 412, a determination is made as to whether or not exposure has been completed for all the transmitted expose data. If the determination in step 412 is negative, the routine returns to step 402 and the exposure process is performed on the next image. If the determination in step 412 is affirmative, then the rotation of the polygon mirror is stopped in the next step 414 and the exposure control process is completed.

Having completed the exposure control process, the printing paper 112 is cut at the unexposed portion in the cutter section 116, and the printing paper 112 is wound back into the magazine 114. The image-exposed portion of the printing paper 112 is fed through each processing tank in the processor section 154 where color developing, bleaching fixing, and washing processes are performed, and then to the drying section 166 where the printing paper 112 is dried, thus visualizing the image exposed in the printer section 110. The dried printing paper 112 is cut between each frame image and is ejected from the printer processor 18.

As has been explained in detail above, in the film image reading apparatus according to the present embodiment, because the charge accumulation time of the CCD area sensor during the prescan is fixed, the structure of the prescan section 36 can be simplified compared with when the charge accumulation time is adjusted, and the overall cost of the device can be reduced.

Moreover, in the film image reading apparatus according to the present embodiment, processes which can be performed on the basis of image data (density value data) obtained by reading under fixed photometric condition and at a comparatively low resolution are allocated to the prescan section 36. And, processes preferably performed on the basis of image data obtained by reading at a comparatively high resolution and which need to have conditions set in accordance with the characteristics and the like of the image to be read can be allocated to the fine scan section 38. This enables a comparatively cheap low resolution CCD area sensor 62 to be used as the CCD area sensor in the prescan section 36, allowing the overall cost of the device to be further reduced.

Further, in the film image reading apparatus according to the present embodiment, because the frame image position, the frame image size, the DX code, and the frame number are detected on the basis of density value data obtained in the prescan, the overall cost of the device can be further reduced compared with when special sensors or the like are used for the above detections.

Moreover, because the film image reading apparatus according to the present embodiment is provided with an image buffer 70 for holding the image data (density value data) obtained in the fine scan section 38 until the auto setup process and the examination of the positive image are completed, the operation of reading the image by the fine scan section 38 can be performed concurrently with the auto setup process and the examination of the positive image enabling a high-speed image reading.

Note that, in the present embodiment, the explanation given was for when all the processes in Table 2 were performed, however, the present invention is not limited to this and an embodiment is also possible where only one or more of the various processes in the prescan section 36 and one or more of the various processes in the fine scan section 38 are performed.

Note also that, in the present embodiment, the explanation given was for when a prescan was performed with both the charge accumulation time of the CCD area sensor 62 and the amount of light from the lamp 52 set as fixed values, however, the present invention is not limited to this and an embodiment is possible where the prescan is performed with, for example, only one of the amount of light from the lamp 52 and the charge accumulation time of the CCD area sensor 62 set as a fixed value.

Note further that, in the present embodiment, the explanation given was for when the auto setup process is performed and the positive image is examined on the basis of the density value data obtained from the fine scan, however, the present invention is not limited to this and the auto setup process may be performed and the positive image may be examined on the basis of the density value data obtained from the prescan. Normally, the prescan is comparatively faster than the fine scan, the auto setup process and the examination of the positive image are performed in the prescan section, enabling a good balance to be achieved between the length of time of the prescan processes and the length of time of the fine scan processes, resulting in the overall processing speed being speeded up. However, because the density value data obtained from the prescan is different to that obtained from the fine scan, if, for example, image processing is performed on density value data from a fine scan under processing condition determined on the basis of density value data from a prescan, then the accuracy of the image processing is reduced in comparison with that of the present embodiment.

Note yet further that, in the present embodiment, the explanation given was for when the amount of exposure for each pixel is determined and scan-exposure was performed for each pixel in the printer section 110, however, the present invention is not limited to this and the present invention can be applied to a plain (analogue) exposure system which is applied to many general printer.

Note also that, in the present embodiment, the explanation given was for when a negative film was used as the photosensitive material of the present invention, however, the present invention is not limited to this and naturally the present invention may also be used for reading a reversal film (a positive film).

According to the image reading apparatus of the first aspect of the present invention, because the photometric condition of the first image sensor provided in the first photometric system is fixed, the structure of the first photometric system can be simplified in comparison to when the photometric is adjusted. Thus the effect of a reduction in the overall cost of the device is achieved.

According to the image reading apparatus of the second aspect of the present invention, processing which can be performed even when image data of a comparatively low level of accuracy is used, is performed on the basis of image data obtained from the first photometric system. Processing which is preferably performed using image data of a comparatively high level of accuracy is performed on the basis of image data obtained from the second photometric system. Therefore, the effect of improving the overall image reading efficiency of the device and speeding up the image reading speed can be obtained.

According to the image reading apparatus of the third aspect of the present invention, the same effect as in the second aspect of the present invention can be realized. At the same time, the effect is obtained that because the image data output from the second photometric system is stored in the storage means until at least one of the determination of the image processing condition for the image data output from the second photometric system and the examination of the image using the image data output from the second photometric system performed by the control means is completed, the image reading operation by the second photometric system and at least one of the determination performed by the control means of the image processing condition for the image data output from the second photometric system and the examination of the image using the image data output from the second photometric system can be performed in parallel, and the image reading process can be speeded up.

According to the image reading apparatus of the fourth aspect of the present invention, the first image sensor is an area sensor while the second image sensor is a line sensor. Therefore, by using a low resolution area sensor as the first image sensor in comparison with the second image sensor, the effect is obtained that a low cost sensor can be used for the first image sensor enabling the overall cost of the device to be reduced.

According to the image reading method of the fifth aspect of the present invention, because an image recorded on a photographic photosensitive material is read by a first image sensor having a fixed photometric condition state, in the same way as in the first aspect of the present invention, the structure of the image reading apparatus can be simplified in comparison to a device whose photometric condition is adjusted. This provides the effect of allowing the cost of producing the present invention to be reduced.

What is claimed is:

1. An image reading apparatus comprising:
    transporting means for transporting a photographic photosensitive material on which an image is recorded in such a way that the image passes in sequence over a first reading position and a second reading position;
    a first photometric system which is provided with a first light source for irradiating light onto the image at the first image reading position and which is also provided with a first image sensor for reading with fixed photometric condition the image and outputting the image as image data on the basis of one of the light transmitted through the image or the light reflected from the image;
    a second photometric system which is provided with a second light source for irradiating light onto the image at the second image reading position and which is also provided with a charge accumulation-type second image sensor for reading the image and outputting the image as image data on the basis of one of the light transmitted through the image or the light reflected from the image; and
    control means for controlling the second photometric system in such a way that the image is read by changing at least one of amount of light irradiated from the second light source and a charge accumulation time of the second image sensor on the basis of the image data output from the first image sensor.

2. The image reading apparatus according to claim 1, wherein the control means performs:
    at least one of: the detection of the position of the image; the detection of the size of the image; the detection of a DX code when the DX code is affixed to the photographic photosensitive material; the detection of the frame number when the frame number is affixed to the photographic photosensitive material; the determination of whether or not the image is an unneeded image; and the determining of the photometric condition of the second photometric system on the basis of the image data output from the first photometric system; and
    at least one of: the determining of the processing condition for the image processing for the image data output from the second photometric system; and the inspection of the image using the image data output from the second photometric system on the basis of the image data output from the second photometric system.

3. The image reading apparatus according to claim 2, further comprising:

storage means in which the image data output from the second photometric system is stored until at least one of the determining of the processing condition for the image processing for the image data output from the second photometric system and the examination of the image using the image data output from the second photometric system is completed.

4. The image reading apparatus according to claim 3, wherein the first image sensor is an area sensor and the second image sensor is a line sensor.

5. The image reading apparatus according to claim 2, wherein the first image sensor is an area sensor and the second image sensor is a line sensor.

6. The image reading apparatus according to claim 2 wherein the control means performs the determination of whether or not the image is an unneeded image.

7. The image reading apparatus according to claim 1, wherein the first image sensor is an area sensor and the second image sensor is a line sensor.

8. The image reading apparatus according to claim 1 wherein said control means controls the second photometric system such that the image is read by changing the amount of light irradiated from the second light source.

9. The image reading apparatus according to claim 1, wherein the photometric condition of the first photometric system is at least one of: amount of light irradiated from the first light source and a charge accumulation time of the first image sensor.

10. The image reading apparatus according to claim 9, wherein the amount of light irradiated from the first light source and the charge accumulation time of the first image sensor are both fixed.

11. An image reading method, wherein:

a photographic photosensitive material on which an image is recorded is transported in such a way that the image passes in sequence over a first reading position and a second reading position;

light from a first light source is irradiated onto the image at the first image reading position, and the image is read by a first image sensor with fixed photometric condition and output as image data on the basis of one of the light transmitted through the image or the light reflected from the image;

at least one of amount of light irradiated onto the image from a second light source and a charge accumulation time of a charge accumulation-type second image sensor are changed on the basis of the output image data, and light from the second light source is irradiated onto the image at the second image reading position and the image is read by the second image sensor and output as image data on the basis of one of the light transmitted through the image or the light reflected by the image.

12. The image reading method according to claim 11, wherein the photometric condition at the first image reading position is at least one of: amount of light irradiated from the first light source and a charge accumulation time of the first image sensor.

13. The image reading method according to claim 12, wherein the amount of light irradiated from the first light source and the charge accumulation time of the first image sensor are both fixed.

* * * * *